April 4, 1944.   P. A. SCOTT-IVERSEN   2,345,860
MEANS FOR ACTUATING THE CLUTCHES OF MECHANICALLY PROPELLED VEHICLES
Filed Nov. 12, 1942
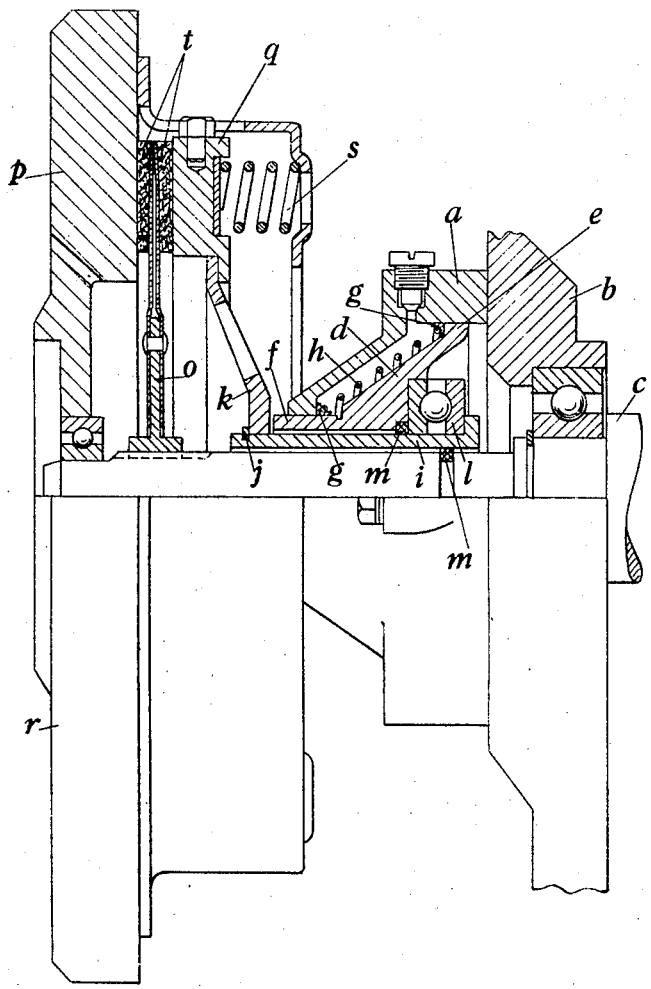
Inventor
P. A. Scott-Iversen
By Glascott Downing & Seebold
Attys.

Patented Apr. 4, 1944

2,345,860

UNITED STATES PATENT OFFICE 2,345,860

MEANS FOR ACTUATING THE CLUTCHES OF MECHANICALLY PROPELLED VEHICLES

Poul Arne Scott-Iversen, Chesford Grange, near Kenilworth, England, assignor to The Rover Company Limited, Chesford Grange, near Kenilworth, Warwickshire, England Application November 12, 1942, Serial No. 465,342
In Great Britain September 27, 1941

3 Claims. (Cl. 192—85)

This invention has for its object to provide improved means for actuating the clutches forming parts of the power transmission mechanisms of mechanically propelled vehicles.

The invention comprises the combination of a cylinder adapted to be mounted concentrically with the axis of the clutch, a piston slidable within the cylinder by liquid under pressure, a rotatable and slidable bush adapted to transmit motion from the piston to the clutch releasing means, and a thrust bearing situated between one end of the bush and the piston and in a region which can be amply supplied with lubricating oil.

The accompanying diagram illustrates in part sectional elevation one mode of constructing in accordance with the invention a clutch operating means adapted to be mounted between the clutch and the adjacent gear box of a vehicle.

Referring to the diagram I employ a cylinder $a$ adapted to be secured to one end $b$ of the gear box and arranged around the portion of the transmission shaft $c$ which extends from the clutch to the gear box. The end of the cylinder which is intended to be secured to the gear box is open and when mounted in position is closed by the adjacent end wall of the gear box. The other end of the cylinder is preferably shaped to a truncated conical form, terminating in a central bore. Within the cylinder is arranged a hollow piston $d$ which is arranged to be slidable but nonrotatable within the cylinder. The piston $d$ is made of truncated conical form, with a narrow peripheral flange $e$ around its larger end which serves to co-operate with the cylindrical portion of the inner surface of the cylinder. At the apex of the conical portion of the piston $d$ is formed a short cylindrical portion $f$ which extends through the said bore at one end of the cylinder $a$. Any convenient provision is made for admitting pressure liquid to the cylinder $a$ from a pump operable by the driver. Leakage of this liquid past either end of the piston $d$ is prevented by any convenient rubber or like flexible packing rings $g$, these being held in position by a helical spring $h$ of truncated conical form located in the portion of the cylinder to which the pressure liquid is admitted.

Within the bore of the piston and surrounding the shaft $c$ above mentioned is arranged a bush $i$ which extends beyond both ends of the piston. The outer end of the bush is adapted by means of a ring $j$ to actuate the clutch releasing member $k$, and between a flange at the inner end of the bush and the adjacent rear surface of the piston is arranged a thrust bearing $l$, this latter comprising a pair of rings respectively supported by the piston and bush and balls or rollers situated between the rings.

Leakage of lubricating oil past the gear box end of the bush $i$ is prevented by sealing rings $m$.

The thrust bearing $l$ is located in the chamber formed by a part of the cylinder $a$, one face of the piston $d$, and the adjacent end wall $b$ of the gear box, and this chamber is such that it can be freely supplied with lubricating oil from the gear box, thus ensuring continuous and ample lubrication of the thrust bearing. Alternatively lubricating oil may be supplied to this chamber otherwise than from the gear box.

When the clutch operating means above described is mounted in position, the portion of the cylinder $a$ at the side of the piston $d$ remote from the thrust bearing $l$ is filled with pressure liquid, as are also the pipe system and pump (not shown) connected to the cylinder. Actuation of the clutch is effected by pressure transmitted by the liquid to the piston $d$. The consequent movement of the piston is transmitted to the clutch through the thrust bearing $l$ and bush $i$. Opposite movement of the piston $d$ is effected by the springs $s$ of the clutch mechanism when the pressure exerted on the movable part of the pump by the driver is released.

In the example illustrated, the clutch is of ordinary form and comprises a driven member $o$ secured to the shaft $c$, driving members $p$, $q$ respectively formed by and connected to the engine fly wheel $r$, and the springs $s$ which by their pressure on $q$ cause the member $o$ to be gripped by $p$ and $q$ through the medium of friction material $t$. The member $k$ engages the part $q$ and is retracted against the springs $s$ by the bush $i$ when pressure fluid is admitted to the cylinder $a$.

By this invention I am able in a very simple and satisfactory manner to obviate certain well known disadvantages associated with the usual forms of foot operated lever mechanisms used for imparting releasing movements to the clutches of mechanically propelled vehicles.

The invention is not limited to the example above described as subordinate constructional details may be varied to suit different requirements. Where a clutch is provided at each end of the gear box essentially similar operating means may be combined with each clutch.

Having thus described my invention what I claim as new and desire to secure by Letters Patent is:

1. Vehicle clutch actuating means comprising the combination of a cylinder adapted to be mounted concentrically with the axis of the clutch, a piston slidable within and wholly enclosed by the cylinder and operable by liquid under pressure applied to one side of said piston, the opposite side of said piston having a recess therein, a rotatable and slidable bush adapted to transmit motion from the piston to the clutch releasing means, and a thrust bearing accommodated in the piston recess and situated between one end of the bush and the piston and in a region which can be amply supplied with lubricating oil.

2. Vehicle clutch actuating means comprising the combination of a truncated conical cylinder having an open larger end and adapted to be mounted concentrically with the axis of the clutch, a hollow truncated conical piston slidable within the cylinder by liquid under pressure and having at its smaller end an extension slidable in a bore at the smaller end of the cylinder, a thrust bearing situated at the inner end of the piston in a region which can be amply supplied with lubricating oil, and a rotatable and slidable bush adapted at its inner end to abut against the thrust bearing and at its outer end to engage the releasing member of the clutch, the arrangement being such that the bush can transmit motion from the piston to the clutch releasing member.

3. Vehicle clutch actuating means comprising the combination of a cylinder adapted to be mounted concentrically with the axis of the clutch, a piston slidable within the cylinder by liquid under pressure, a rotatable and slidable bush adapted to transmit motion from the piston to the clutch releasing means, a thrust bearing situated between one end of the bush and the piston and in a region which can be amply supplied with lubricating oil, packing rings arranged in association with the larger and smaller ends of the piston, and a conical spring for holding the packing rings in position.

POUL ARNE SCOTT-IVERSEN.